May 1, 1951  L. J. BULLIVANT  2,551,524

EXTENSION LEVEL

Filed Jan. 8, 1948

*INVENTOR:*
LINGHAM J. BULLIVANT
BY
ATT'Y

Patented May 1, 1951

2,551,524

UNITED STATES PATENT OFFICE 2,551,524

EXTENSION LEVEL

Lingham J. Bullivant, Zion City, Ill.

Application January 8, 1948, Serial No. 1,189

2 Claims. (Cl. 33—208)

This invention relates in general to a hand instrument commonly used by carpenters, mechanics and others for truing surfaces in vertical or horizontal directions, and is more particularly described as an extension device of this kind for obtaining greater accuracy in such measurements by employing parts which are extensible.

An important object of the invention is to provide a level with an extension thereof by means of which greater accuracy can be obtained with the same leveling indicating parts.

A further object of the invention is to provide a leveling instrument in which a shorter leveling device may be combined with an extension part thereof to give the accuracy obtained with a longer level, the shorter instrument being collapsible so that it may be contained in a shorter tool case or cabinet.

Still a further object of the invention is to provide an extension level in which the extension part is accurately held with respect to the level indicating means to prevent lost motion and inaccuracies.

Other objects of the invention will appear in the specification and will be apparent from the accompanying drawings in which, Fig. 1 is a side elevation of an extension level in accordance with this invention in collapsed or closed position;

Figure 1:
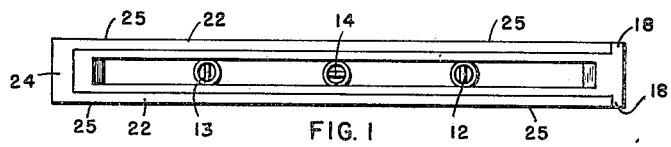
Figure 2:
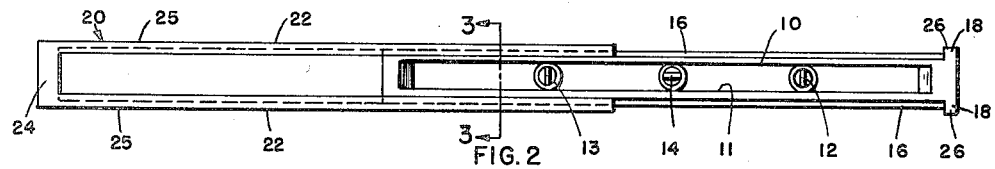
Fig. 2 shows the level of Fig. 1 in an extended position.
Figure 3:
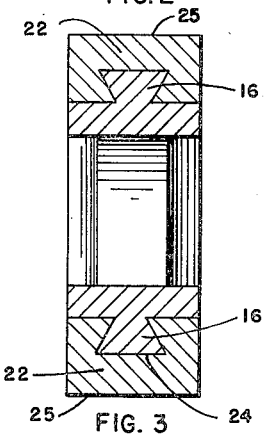
Fig. 3 is a transverse section taken on the line 3—3 of Fig. 2.
Figure 4:
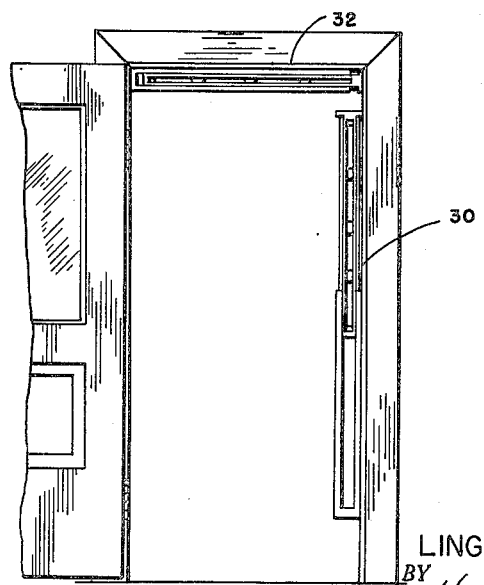
Fig. 4 shows the application of levels of this kind as applied to the top and side frames of a door.

In using a level, it is desirable to have the instrument as long as possible to obtain greater accuracy; the shorter the level for measuring most surfaces, the less the accuracy for a carpenters' or tool makers' chest or cabinet. The practical limit in the length of a level is often determined by the size of the carrying case.

The present invention provides a means for practically doubling the accuracy of a level without increasing its size for carrying purposes; or stating it another way, the size of the level to obtain the same accuracy as now provided in such measurements may be cut substantially in half. By providing three or more similar extensible parts, the accuracy may be similarly increased or the size of the instrument correspondingly reduced.

Referring now more particularly to the drawings, a level of the type commonly used by carpenters and others comprises a frame 10 of metal, wood, or other suitable material having an interior space 11 in which are bubble levels 12 and 13 disposed in one direction and 14 disposed in a direction at right angles thereto.

The present invention includes side ribs 16 which are undercut or dovetail at both sides and preferably formed integral with the outer edges of the side frames. At one end of the level are projections 18 forming leveling extensions which project beyond the side ribs 16.

A telescoping extension 20 has side pieces 22 substantially as long as the frame 10 connected at one end by a crosspiece 24 preferably integral therewith. The inner edge of each side piece is formed with an undercut or dovetailed grooves 24 adapted to fit closely but slidably upon one of the ribs 16 so that the extension may be applied to the level at the end opposite the projections 18 and telescoped upon the level until the crosspiece 24 engages the end of the level. Each outer surface 25 registers exactly with an outer surface 26 of the projection 18 and because of the dovetail connection between the ribs 16 and the grooves 24, these surfaces will be maintained in alignment throughout the movements of the extension in any position.

With this construction, the level in its collapsed or extended position may be applied to any surface and the engagement of the surface 25 and 26 at the same side in the extended position will increase the accuracy of leveling measurement of the instrument to the extent that the length of the instrument is increased. When applied to measure a somewhat lengthy surface as a side frame 30 of a door opening, the level can be extended to its full length but when applied to a top piece 32, the level may be entirely collapsed or only partially extended. In each case, the contact surface 26 at one end of the level is accurately in alignment with the outer surface 25 of the same side of the instrument and any contact with these two surfaces will serve to apply the instrument for leveling purposes.

Although the preferred construction has been described in detail, it should be regarded as an illustration or example of the structure and not as a limitation or restriction thereof, as many other constructions, combinations, and arrangements of the parts may be made without departing from the spirit and scope of the invention.

I claim:

1. An extension level, comprising a level frame having leveling devices mounted therein, projections at opposite side edges of one end of the frame, undercut ribs extending for the remainder of the side edges, extension rails connected by a crosspiece at the end opposite the frame projections, each rail having an inner undercut groove to fit the corresponding undercut rail and the two rails and the crosspiece fitting closely over the sides and one end of the level opposite the said projections, the outer edges of the rails and the projections of the level being held in alignment by the undercut ribs and grooves in all adjusted positions of the extension with respect to the level.

2. An extension level, comprising a level frame having leveling devices mounted therein and projections at opposite side edges of one end thereof, a U-shaped extension fitting over the other end of the frame at the side edges and end thereof and the outer edges flush with the outer edges of said projections, the respective outer and inner side edges of the frame and extension having interengaging tongue and groove slidable connections for holding the said outer edges flush with each other in all adjusted positions of the extension.

LINGHAM J. BULLIVANT.

REFERENCES CITED

The following references are of record in the file of this patent:

UNITED STATES PATENTS

| Number | Name | Date |
| --- | --- | --- |
| 691,063 | Lesh | Jan. 14, 1902 |
| 1,403,676 | Eltag | Jan. 17, 1922 |
| 1,413,056 | Parrish et al. | Apr. 18, 1922 |
| 1,430,904 | Hunter | Oct. 3, 1922 |
| 1,848,003 | Chalupny | Mar. 1, 1932 |
| 2,419,451 | Keller | Apr. 22, 1947 |